United States Patent
Johansson et al.

(10) Patent No.: US 10,902,592 B2
(45) Date of Patent: Jan. 26, 2021

(54) ANALYSIS OF IMAGES OF BIOLOGICAL MATERIAL

(71) Applicant: Q-linea AB, Uppsala (SE)

(72) Inventors: Caroline Johansson, Uppsala (SE); Amin Allalou, Uppsala (SE); Ylva Molin, Uppsala (SE); Magnus Sandow, Uppsala (SE); Carolina Wahlby, Uppsala (SE)

(73) Assignee: Q-Linea AB, Uppsala (SE)

( * ) Notice: Subject to any disclaimer, the term of this patent is extended or adjusted under 35 U.S.C. 154(b) by 46 days.

(21) Appl. No.: 16/310,148

(22) PCT Filed: Jun. 15, 2017

(86) PCT No.: PCT/EP2017/064713
§ 371 (c)(1),
(2) Date: Dec. 14, 2018

(87) PCT Pub. No.: WO2017/216312
PCT Pub. Date: Dec. 21, 2017

(65) Prior Publication Data
US 2019/0333211 A1    Oct. 31, 2019

(30) Foreign Application Priority Data

Jun. 15, 2016 (GB) .................................. 1610425.9

(51) Int. Cl.
*G06K 9/00* (2006.01)
*G06T 7/00* (2017.01)
*G02B 21/24* (2006.01)

(52) U.S. Cl.
CPC ........ *G06T 7/0012* (2013.01); *G06K 9/00127* (2013.01); *G02B 21/244* (2013.01);
(Continued)

(58) Field of Classification Search
CPC combination set(s) only.
See application file for complete search history.

(56) References Cited

U.S. PATENT DOCUMENTS 7,687,239 B2   3/2010   Goldberg et al.
8,891,869 B2   11/2014  Yu et al.
(Continued)

FOREIGN PATENT DOCUMENTS

EP    2 927 311 A1    10/2015

OTHER PUBLICATIONS

He, A Bayesian Local Binary Pattern Texture Descriptor, 2008, IEEE (Year: 2008).*

(Continued)

*Primary Examiner* — Alex Kok S Liew
(74) *Attorney, Agent, or Firm* — Fay Sharpe LLP (57) ABSTRACT

A method for analysis of a digital image in order to determine a value relating to an amount of a substance shown in the image includes using a threshold to identify all pixels of the digital image above or below a certain intensity value in order to produce a first binary image. Texture filtering is used to identify regions of high texture in the digital image to produce a second binary image in which all regions of high texture are pixels with a first state. The first and second binary images are overlayed to produce a combined binary image. A value relating to the amount of the substance is determined based on the area of the combined binary image with pixels having the first state.

20 Claims, 8 Drawing Sheets

(52) U.S. Cl.
CPC ............... *G06T 2207/10056* (2013.01); *G06T 2207/30004* (2013.01)

(56) References Cited

U.S. PATENT DOCUMENTS

| | | |
|---|---|---|
| 2007/0020697 A1 | 1/2007 | Cualing et al. |
| 2007/0110319 A1* | 5/2007 | Wyatt ...................... G06K 9/40 382/199 |
| 2011/0274322 A1* | 11/2011 | Kern .................... A61B 3/0025 382/128 |
| 2015/0337352 A1 | 11/2015 | Kwon et al. |
| 2016/0010138 A1 | 1/2016 | Shamsheyeva et al. |
| 2016/0102334 A1 | 4/2016 | Jung et al. |
| 2016/0196480 A1* | 7/2016 | Heifets ................ G06K 9/6267 382/158 |

OTHER PUBLICATIONS

Bi, An effective edge extraction method using improved local binary pattern for blurry digital radiography images, 2012, Elsevier (Year: 2012).*

Chantell, Christina, "Multiplexed Automated Digital Microscopy for Rapid Identification and Antimicrobial Susceptibility Testing of Bacteria and Yeast Directly from Clinical Samples", Clinical Microbiology Newsletter, vol. 37, No. 20 (2015) pp. 161-167.

Choi, Jungil et al., "Rapid and High Throughput Antimicrobial Susceptibility Test Using Morphological Analysis of Single Cells with Microfluidic Channel in 96 Well Platform", Choi et al, 17th International Conference on Miniaturized Systems for Chemistry and Life Sciences, (Oct. 27-31, 2013) Freiburg, Germany, pp. 548-550.

Fredborg, Marlene et al., "Real-Time Optical Antimicrobial Susceptibility Testing", Journal of Clinical Microbiology, vol. 51, No. 7 (Jul. 2013) pp. 2047-2053.

Fredborg, Marlene et al., "Automated Image Analysis for Quantification of Filamentous Bacteria", BMC Microbiology (2015) 15:255, pp. 1-8.

Heelan, Judith S. et al., "Resistance of Group B *Streptococcus* to Selected Antibiotics, Including Erythromycin and Clindamycin", Journal of Clinical Microbiology, vol. 42, No. 3 (Mar. 2004) pp. 1263-1264.

Parthenis, K. et al., "An Automatic Computer Vision System for Blood Analysis", Microprocessing and Microprogramming, vol. 28, No. 1-5 (1989) (Retrieved on Mar. 1, 1990) pp. 243-246.

Tan, Cheemeng, et al., "The Inoculum Effect and Band-Pass Bacterial Response to Periodic Antibiotic Treatment", Molecular Systems Biology 8, No. 617 (2012) pp. 1-11.

Yuen, Pikkei et al., "Improved Detection Algorithms for Label-Free Time-Lapse Cytometry of Bacterial Microcolonies for Rapid Antibiotic Susceptibility Testing", EP0316, ECCMID (2016) 2 pages.

International Search Report/Written Opinion of International Application No. PCT/EP2017/064713 dated Aug. 23, 2017, 15 pages.

United Kingdom Search Report of GB 1610425.9 dated Dec. 1, 2016, 4 pages.

* cited by examiner

ANALYSIS OF IMAGES OF BIOLOGICAL MATERIAL

The present invention relates to methods and devices for analysis of images in order to determine the amount of a substance shown in the images. In preferred examples the method concerns images of biological material to determine a value relating to the amount of biological material.

It is often required to be able to determine the amount of a substance, for example in clinical or biological testing. Image based analysis of samples can provide a way to do this, with automated assessment of the amount of a substance such as a biological material using a digital image of a sample.

One area where this is of interest is to speed up antibiotic susceptibility testing (AST). Great interest has arisen around microscopy based methods for AST. Examples of such are described, for example, in U.S. Pat. No. 7,687,239, US2016/010138 and US2015/337352.

U.S. Pat. No. 7,687,239 proposes moving microorganisms to a surface, where they are grown in the presence and absence of antimicrobials. By monitoring the growth of the microorganisms over time in the two conditions, their susceptibility to the antimicrobials can be determined. The monitoring can comprise optical detection and U.S. Pat. No. 7,687,239 suggests that this most conveniently includes the detection of individual microorganisms.

US2016/010138 discloses an automated digital microscopy microorganism detection system using image analysis software to detect first and second values at first and second times, and to use those values to determine a growth rate for the microorganisms. The image analysis process involves seeding, registration, object model fitting, and clone tracking in order to track individual clones during growth.

US2015/337352 describes a method where the microbe is immobilized in a solid thin film, a bioactive agent is supplied to the solid thin film and allowed the bioactive agent to diffuse into the solid thin film; and individual responses of the single microbial cells to the bioactive agent are imaged. The minimum inhibitory concentration (MIC) of the bioactive agent is determined based on the analysis of the images to obtain AST results.

An important feature of a successful automated method for analysis of images in this context is that it should be able to fully automatically provide data from a microscopic image without a requirement for manual intervention in the analysis procedure. Manual interpretation of microscopic images for rapid AST have been shown to have great promise (Choi et al, 17th International Conference on Miniaturized Systems for Chemistry and Life Sciences 27-31 2013, Freiburg, Germany). Choi et al follow individual clones immobilized in agar.

In Fredborg et al (BMC Microbiology (2015) 15:255) they describe an algorithm capable of handling filamentous bacteria in broth. This is an addition to their earlier work on non-filamentous bacteria (Fredborg et al J. Clin Microbiology 2013; 51:2047-53). The paper describes the problem that elongation of bacteria as a consequence of antibiotics, especially beta-lactams, may be mis-interpreted as growth. They therefore propose to use a separate method for analysis of filamentous bacteria. The authors propose to combine their so called SESA (Segmentation and Extraction of Surface Area) and SEAL (Segmentation Extraction of Average Length). The method allows for specific detection of beta-lactam induced filamentation and can indicate that the growth value could be compromised and hence not trusted. However, by focussing only on filamentous bacteria the result is that several methods are needed to allow for the various different possible responses of different bacteria-antibiotic combinations.

A recent development of the image analysis of microscopy images has been presented by Yuen et al (Yuen et al, EP0316, ECCMID 2016). By using cluster analysis they have enabled very rapid AST for S. aureus and P. aeruginosa by using cluster analysis of single cells growth. However, this method thus does not lend itself for motile pathogens in broth micro-dilution assays as well as is sensitive to clusters of pathogens that may occur naturally in a sample.

Another method described in the literature is automated microscopy detecting growth curves for individual clones immobilized in agar, such as is described by Chantell C., Clinical Microbiology Newsletter 37:20:2015. For the method to work it has been required, as noted by the author, to develop different methods for each organism-antimicrobial combination. The requirement for developing new methods for each and every organism-antibiotic combination makes it difficult to rapidly develop new tests as well as make the method sensitive for new resistance mechanisms that exhibit new morphological modifications of an organism.

For AST some organism antibiotic combinations may exhibit delayed resistance (e.g. Heelan et al, Journal of clinical Microbiology, March 2004, p 1263-1264) as well as may show concentration dependent growth in presence of antibiotics (e.g. Tan et al, Molecular Systems and Biology 8:167 (2012). It is therefore important for a successful method that the method is not easily saturated, e.g. if clones grown together due to high biomass or are so dense that it is difficult to discern individual clones in a broth.

It will be understood that these prior art methods tend to focus on particular pathogen-antibiotic combinations or on specific morphologies. There is also often a requirement to track individual clones, which often necessitates separate algorithms for different types of microbial growth. These prior art techniques do not allow for a single image analysis method to be applied to images of multiple morphologies, and also only have utility for particular scenarios. It would be highly advantageous to obtain an image analysis technique allowing for analysis of any pathogen-antibiotic combination, without restriction as to morphology, and without needing to track individual clones. A technique of that type would be invaluable for image based analysis of biological samples such as AST and could also have utility in other fields where it is required to automatically determine the amount of a substance in an image.

Viewed from a first aspect, the invention provides a method for analysis of a digital image in order to determine a value relating to the amount of a substance shown in the image, wherein in the digital image the presence of the substance can be identified based on the intensity of pixels of the digital image, the method comprising:

using a threshold to identify all pixels of the digital image above or below a certain intensity value in order to produce a first binary image in which regions of high concentration of the substance are pixels with a first state of first and second states of the pixels of the first binary image, for example pixels representable as black pixels;

using texture filtering to identify regions of high texture in the digital image and produce a second binary image in which all regions of high texture are pixels with a first state of first and second states of the pixels of the second binary image, for example pixels representable as black pixels;

overlaying the first and second binary images to produce a combined binary image, wherein the pixels with the first state in one or both of the first and second binary images are pixels with a first state of first and second states of the pixels of the combined binary image, for example pixels representable as black in the combined binary image, and the pixels with the second state in both of the first and second binary images are pixels with a second state of first and second states of the pixels of the combined binary image, for example pixels representable as white pixels in the combined binary image; and determining the value relating to the amount of the substance based on the area of the combined binary image with pixels having the first state.

Figure 6:
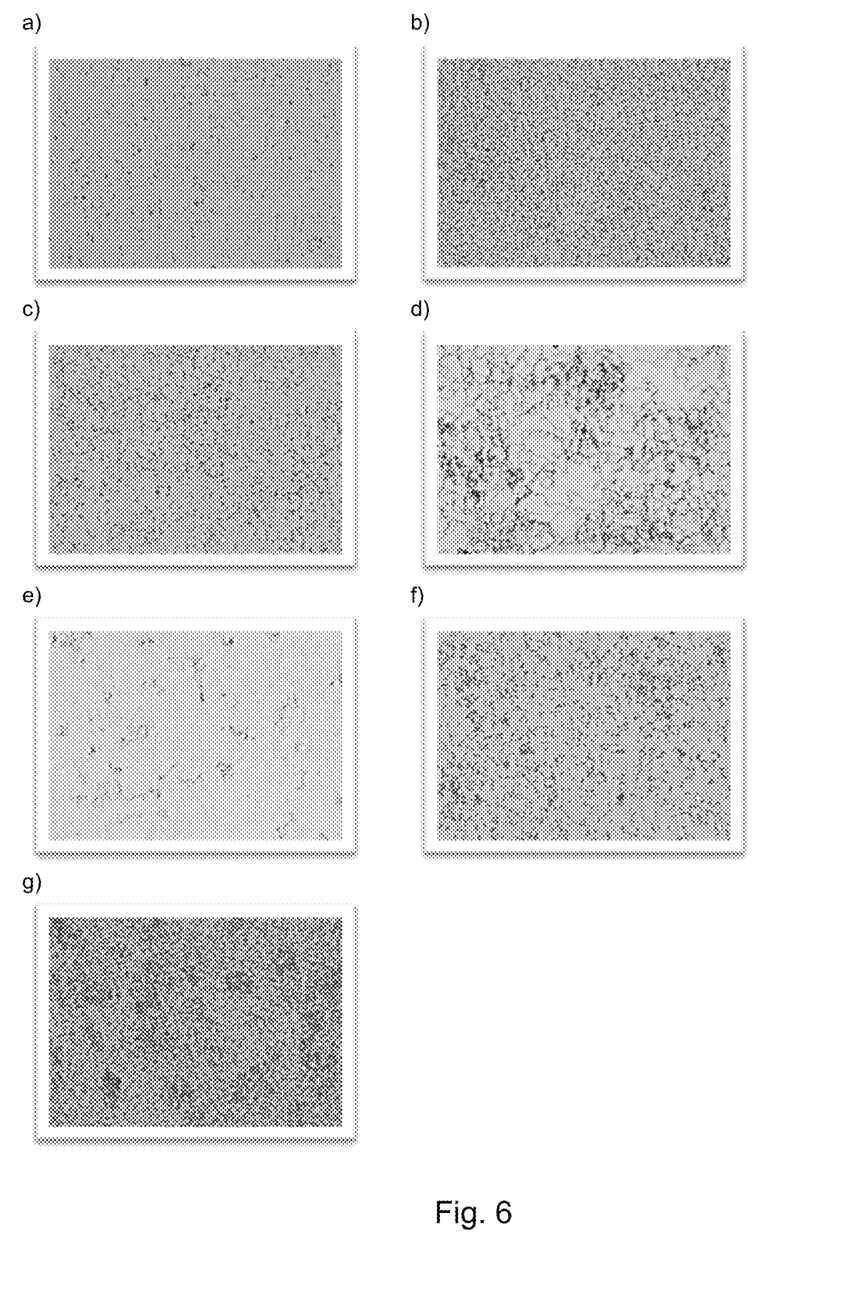
FIGS. 6a to 6g show different pathogens with differing morphologies.
Figure 7:
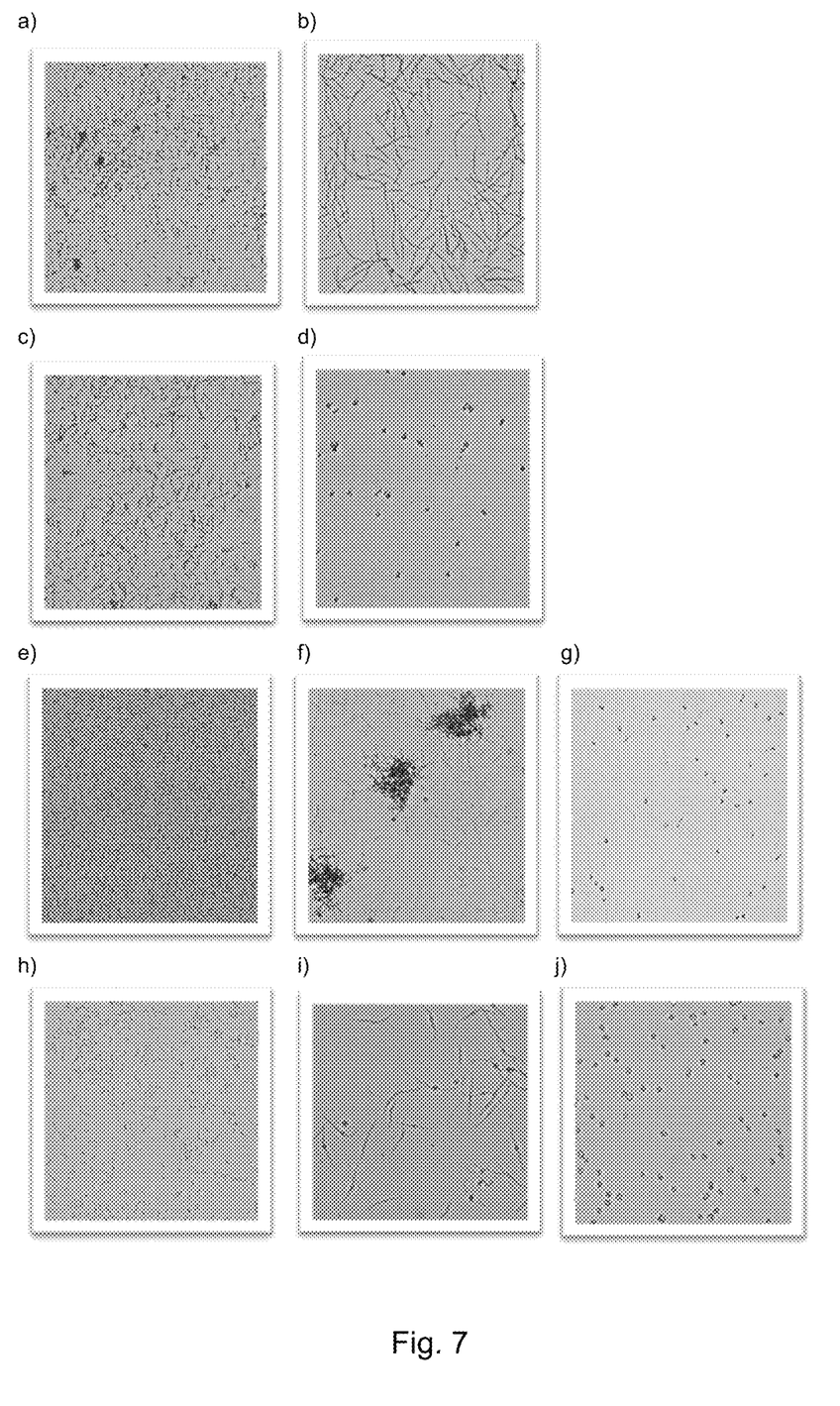
FIGS. 7a to 7j show sets of photos for E. coli, P. aureginosa and P. mirabilis where different morphologies have arisen with exposure to antibiotics.
Figure 8A:
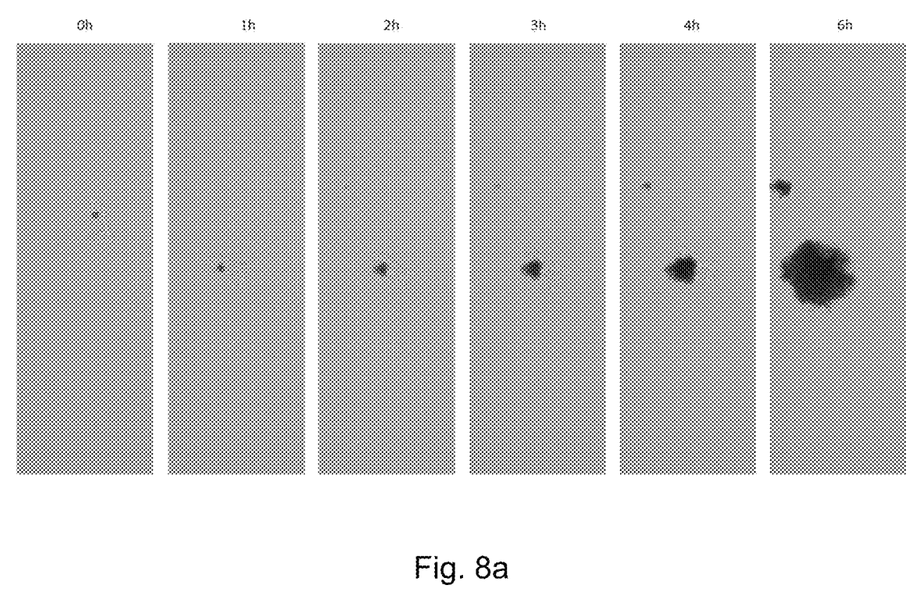
FIGS. 8a to 8e show different behaviour from different strains of S. aureus.
Figure 8B:
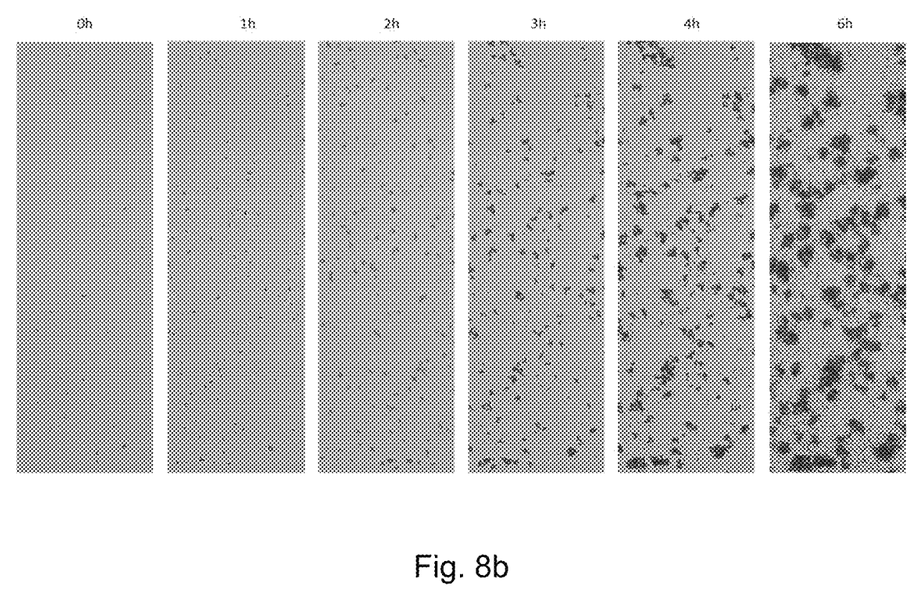
Figure 8C:
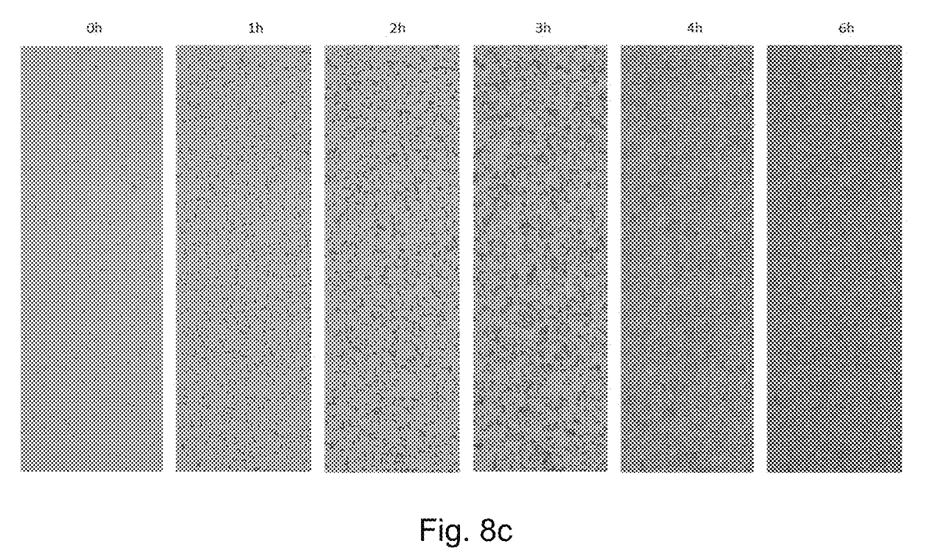
Figure 8D:
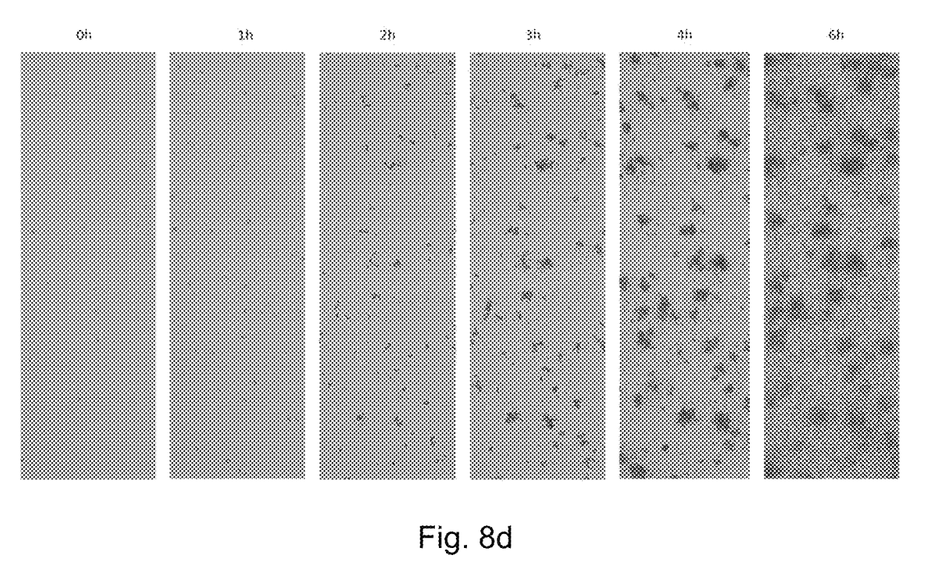
Figure 8E:
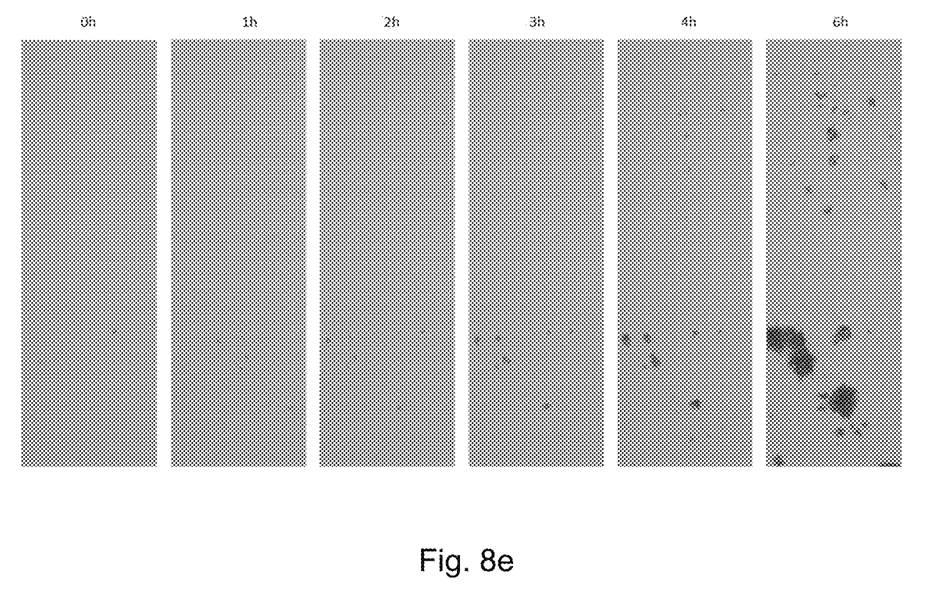

This method can provide a generic image analysis method for determining the amount of a substance no matter what shape or form the substance takes in the image. The method is of particular benefit when the substance is a biological material of a type that can take many different forms in the image, such as pathogens that can grow or multiple in different morphologies depending on the type of pathogen and on the conditions to which it is exposed. FIGS. 6 to 8 show examples of different morphologies for bacterial growth in various situations. The proposed method is able to accurately quantify the amount of biological material in all of these cases, despite the greatly differing characteristics of the images. Similar principles will apply to other substances, including other types of biological material as well as non-biological material.

The combination of parallel processing of the original image based on intensity and on texture and then overlaying of the resultant binary image data allows for the substance to be shown on the image in localised concentrations and/or in distributed patterns without affecting the accuracy of the determination of the amount of the substance. The inventors have realised that whilst a simple thresholding algorithm can be useful for substances in concentrated regions, such as the bacterial growth of at least some strains of *S. aureus*, it Will not Accurately Identify the Amount of Substances that have a big distribution across the area of the image, and also may not accurately identify the outer bounds of a substance where there is no sharp edge. For example, considering bacterial growth again, some bacteria such as *E. coli* will show up as highly textured images without any high concentrations of pathogens in a small area. Such images might have very few areas that will meet the required threshold, but nonetheless may contain a large amount of the substance of interest. By combining binary images from a thresholding step and then a texture filtering step the method makes it possible to allow for images with substances appearing in either or both of these types of forms (as well as other forms) without becoming ineffective at identifying the amount of a substance in either case. It will of course be appreciated that bacterial growth in general and *S. aureus/E. coli* in particular are examples only and the advantages of the proposed method apply to any substances where the distribution of the substances takes various forms in an image and where it is desirable to find the amount of the substance.

It is to be noted that the binary images and their pixels are necessarily described as being 'representable' as black pixels since in practice a binary image file does not specify colour as such, but instead is effectively computer data that one can choose to represent as black and white. The first state and the second state of each of the binary images could be consistent, such that the first state of each image takes the same value in the binary image file, and the second state of each image takes the other value in the binary image file. In this case the method involves creating first, second and combined binary images wherein each binary image has pixels with either a first state or a second state, with the first binary image being an image where pixels of the original digital image above or below a certain intensity value are assigned the first state and the remaining pixels are assigned the second state; with the second binary image being an image in which all regions of high texture are assigned the first state and the remaining pixels are assigned the second state; and with the combined binary image being an image where pixels with the first state in one or both of the first and second binary images are assigned the first state in the combined binary image and the pixels with the second state in both of the first and second binary images are assigned the second state in the combined binary image. The value relating to the amount of the substance is hence based on the area of the combined binary image with pixels of the first state. The reference to black and white is made to differentiate between the first and second states (i.e. 0 and 1, or 1 and 0 'values') for the pixels of the binary image in order that one can easily visualise the operation of the algorithm, but the definition of pixels as being representable as black (or white) does not limit the content of the binary image data in any way.

One skilled in the art will appreciate that any suitable scheme could be used in the event that the binary images are displayed to the user, and in fact that the algorithm may process the digital image and generate the binary images without any visual representation, with the output from the process simply being the value that relates to the amount of the substance.

It will also be noted that the original image may show the substance as either darker or brighter in terms of the intensity of the pixels, with a selection being made of pixels that are either above or below a threshold for intensity depending on the nature of the original image.

The original digital images are images with a greater range of pixel intensity than the binary images, and may be grayscale images or colour images for example. When a grayscale image is used then the intensity of the pixels may be used directly within the method of the first aspect. If a colour image is used then in some instances the luminance/intensity may be used directly, with other parameters relating to the pixels being ignored, or optionally the colour image may first be converted to grayscale. The addition of a conversion step can allow for subsequent processing of colour images for the intensity threshold and texture filtering algorithm to be done in the exact same way as grayscale images, which may simplify those steps.

References to an image as used herein include any form of image file or image data that can be shown as an image. Thus, the references to an image should be understood to refer to any form of computerised/digital images consisting of data that are representable as an image and, for example, could be represented as pixels in a two dimensional image.

The original digital image may be any format capable of showing the substance of interest. Thus, the images may be images based on transmitted light, such as bright field or dark field imaging, and in particular including magnified images from microscopy imaging devices. The images could be from any type of camera, including area or line cameras, and CCD or CMOS type devices.

In alternatives to transmitted light, the images may be based on reflected light and/or may make use of fluorescence of the substances to be imaged, again with the optional use of microscopy imaging devices. Combinations of reflected light, transmitted light and/or fluorescence may be used. Since the proposed image analysis method can be applied to some extent independently of the type of substance and the nature of the image then the imaging technique can be adjusted to best suit the substance of interest.

In advantageous examples of the method the substance is a biological material in which case the method may be seen as a method for determining biomass in a sample shown in the image. The method may be carried out with images obtained from microscopy techniques. The biological material may be a pathogen in a clinical sample, for example being tested to determine the drug susceptibility of the pathogen. An example of this is the use of the image analysis method for antibiotic susceptibility testing (AST).

The ability to provide rapid and automatic interpretation of microscopic images for determining the amount of a substance in clinical testing such as AST is invaluable, and allows for a significant reduction in the time needed to complete such testing and provide results allowing for effective treatment of the patient.

Thus, the images may be images of pathogens growing in different conditions, for example, with different antibiotics and/or different antibiotic concentrations, and the substance is hence the amount of pathogens in the image. The value determined by the method can be related to the amount of pathogens and for example may be a measure of the amount of biomass shown in the image.

The method may be for determining the amount of pathogens such as bacteria in a sample and hence may be used to determine the minimal inhibitory concentration (MIC) for inhibition of pathogen growth. This may advantageously be in the context of antibiotic susceptibility testing (AST), and the method may hence be a method for AST comprising the steps of the first aspect and optionally any other steps discussed herein. The method may include repeated analysis of a sample including the substance of interest by using two or more digital images of the sample taken at different times. This can be in order to determine a change in the amount of the substance, for example a growth of organic matter. Thus, the method may be carried out for a first digital image of a sample showing a substance of interest in order to determine a first value relating to the amount of the substance based on the area of the combined binary image with pixels having the first state and the method may be repeated for a second digital image of a sample showing the substance of interest in order to determine a second value relating to the amount of the substance based on the area of the combined binary image with pixels having the first state, wherein the first and second digital images are taken at different times. The method may include comparison of the first value and the second value.

The area of the first binary image with pixels having the first state of the first binary image and/or area of the second binary image with pixels having the first state of the second binary image may be determined. This can provide information about the nature of the substance since the relative contribution of the first binary image and/or of the second binary image to the total amount of area of the combined binary image will change depending on how the substance appears in the original digital image. These steps could be repeated for first and second digital images taken at different times, with a comparison being made in order to find a change in the area of the first or second binary image.

The method may include using an image analysis algorithm for one or more of producing the first binary image, producing the second binary image, overlaying the images and determining the value relating to the amount of the substance. In an example a single image processing algorithm is used to carry out all of these steps, and this may be executed on a single computing device. However it will be appreciated that the various image processing steps could be split between multiple image processing algorithms on one or more computing devices and/or between multiple separate hardware or software modules. The image processing algorithm may be implemented based on software on a programmable computing device such as a computer's Central Processing Unit (CPU) or Graphics Processing Unit (GPU), or it may be implemented fully or partly in hardware, for example using a Field Programmable Gate Array (FPGA) or Application Specific Integrated Circuit (ASIC).

The step of using a threshold to identify all pixels of the digital image above or below a certain intensity value may comprise comparing an intensity value of each pixel to a threshold value, and assigning a state to each pixel such that all pixels either above or below the threshold value have the first state of the first binary image and all other pixels have the second state. The threshold value and the requirement for being either above or below this value may be set by the user. For example, the threshold value may be 50% of the maximum intensity of the pixels and it may be required for pixels to be below this value to be assigned the first state. This is analogous to identifying the darkest pixels of the image, which may be used for finding biological material in a transmitted light image. Thus, the thresholding step may create a first binary image in which areas with a high concentration of the substance are identifiable, whilst areas with a lower concentration are ignored. In the context of biological material, this step may identify biological material that is in clusters, for example as with the growth of *S. aureus* mentioned above.

The step of using texture filtering to identify regions of high texture in the digital image may include taking account of the difference in intensity of adjacent and/or nearby pixels and assigning the first state of the second binary image to those pixels in regions of higher variations in intensity, whilst assigning the second state to the other pixels, which will be in regions of lower variations in intensity. In this way the texture filtering algorithm can identify areas of higher texture but potentially lesser concentration. As explained above, by combining binary images from a threshold step and then a texture filtering step the method makes it possible to allow the amount of a substance to be determined whether the substance is formed in concentrated areas or in a distributed fashion giving a texture image. The texture filtering step might for example include determining the increase and decrease of intensity of pixels in the neighbourhood of the pixel of interest, and it may include assigning the first state of the second binary image to pixels where there is an increase and decrease of intensity above or below a given value in the neighbourhood of the pixel of interest. In this way the texture filtering step can identify areas where the substance is present even when it is distributed across the image, such as a fibrous and/or speckled distribution.

An example texture filtering process includes first smoothing the original image, then applying a texture filter and then a thresholding step. Smoothing is applied to even out the irregularities in the background and to thereby facilitate the downstream analysis using the texture filter and thresholding. The smoothing may use a Gaussian smoothing process (also known as Gaussian blur). This can reduce image noise and reduce detail. In one example the Gaussian smoothing is performed by using a 5×5 Gaussian filter with a $\sigma$ of 2. The smoothing step generates a new digital image, which is preferably a grayscale image. After smoothing a texture filter is applied in order separate low texture areas from high texture areas based on the intensity of the pixels in the smoothed image.

The texture filter may be a variance filter or a gradient filter, for example.

The variance filter includes determining variance of the intensity of pixels in the neighbourhood of the pixel of interest in the smoothed image. The variance may be calculated within a defined neighbourhood of 9×9 pixels. A new image is created by the variance filter, and this may be a grayscale image with the intensity of the pixels being set based on the variance of the neighbouring pixels in the smoothed image.

The gradient filter measures the spatial variation of intensity values across the image. A high gradient value is determined at any point in the image where the intensity varies abruptly (for example, from black to white). A low gradient is determined at any point where the intensity varies smoothly (for example, from a dark grey to a slightly lighter grey). The gradient may be positive or negative, depending on whether the intensity increases or decreases. However, in general, only the absolute gradient may be considered, since all that is of interest is whether the intensity variation is abrupt or smooth. A new image is created by the gradient filter, and this may be an image (for example a greyscale image) with the intensity of the pixels being set based on the gradient of the pixels in the smoothed image.

A threshold is then applied to the texture filtered image (i.e. the image to which the gradient filter or variance filter has been applied) to obtain the second binary image. The thresholding may be similar to that described above in relation to processing of the original digital image to get the first binary image.

The method may include a noise-reduction step carried out before the step of using a threshold to identify all pixels of the digital image above or below a certain intensity value and before the step of using texture filtering to identify regions of high texture in the digital image.

The noise-reduction step may comprise taking a first reference image at an initial time-point and subtracting that reference image from the digital image.

Alternatively, the noise-reduction step may comprise taking a first reference image at an initial time-point and dividing the digital image by the reference image.

Any artefacts in the digital image that are not indicative of the presence of the substance (for example, debris or imperfections in a sample holder or slide containing the substance) but which are present in the reference image may then be removed in the noise-reduction step. Where the imaging is carried out to determine the amount of pathogens in a sample, for example in the context of AST, the initial time-point may be before substantial growth of the pathogens.

Overlaying the first and second binary images to produce a combined binary image can be achieved in any suitable way, for example by identifying all pixels with the first state in one or both of the first and second binary images, assigning them the first state of the combined binary image, and assigning all other pixels the second state of the combined binary image. Alternatively the overlay step may include identifying all pixels with the second state in both of the first and second binary images assigning them the second state of the combined binary image, and assigning all other pixels the first state of the combined binary image.

The step of determining a value relating to the amount of the substance may comprise determining the total number of pixels of the first state in the combined binary image and finding the ratio of the number of pixels of the first state to the total number of pixels in the combined binary image. This provides a percentage value for the amount of substance shown in the original digital image, for example a percentage measure of the amount of biomass where biological material is the substance of interest. This can be used, for example, in the context of AST to provide a measure of pathogen growth.

Viewed from a second aspect, the present invention provides a computer programme product containing instructions that when executed on a data processing system will cause the data processing system to carry out the method of the first aspect and optionally of any or all additional steps described above.

Thus, the instructions, when executed, may cause the data processing system to analyse a digital image in order to determine a value relating to the amount of a substance shown in the image, wherein in the digital image the presence of the substance can be identified based on the intensity of pixels of the digital image, the analysis comprising:

using a threshold to identify all pixels of the digital image above or below a certain intensity value in order to produce a first binary image in which regions of high concentration of the substance are pixels with a first state of first and second states of the pixels of the first binary image, for example pixels representable as black pixels;

using texture filtering to identify regions of high texture in the digital image and produce a second binary image in which all regions of high texture are pixels with a first state of first and second states of the pixels of the second binary image, for example pixels representable as black pixels;

overlaying the first and second binary images to produce a combined binary image, wherein the pixels with the first state in one or both of the first and second binary images are pixels with a first state of first and second states of the pixels of the combined binary image, for example pixels representable as black in the combined binary image, and the pixels with the second state in both of the first and second binary images are pixels with a second state of first and second states of the pixels of the combined binary image, for example pixels representable as white pixels in the combined binary image; and determining the value relating to the amount of the substance based on the area of the combined binary image with pixels having the first state.

The analysis may also include the use of original digital images as set forth above, the image processing steps as described above and/or may be for the purpose of determining an amount of a substance such as biological material as set out above. As noted above, it will be appreciated that the various image processing steps could be split between multiple image processing algorithms on one or more computing devices and/or between multiple separate hardware or software modules. Thus, the data processing system may include multiple devices acting together to carry out the image analysis.

Viewed from a third aspect, the present invention provides an image processing system arranged to carry out the method of the first aspect and optionally any or all of the additional steps set out above.

Thus, there may be an image processing system for analysing a digital image in order to determine a value relating to the amount of a substance shown in the image, wherein in the digital image the presence of the substance can be identified based on the intensity of pixels of the digital image, the image processing system being arranged to:

use a threshold to identify all pixels of the digital image above or below a certain intensity value in order to produce a first binary image in which regions of high concentration of the substance are pixels with a first state of first and second states of the pixels of the first binary image, for example pixels representable as black pixels;

use texture filtering to identify regions of high texture in the digital image and produce a second binary image in which all regions of high texture are pixels with a first state of first and second states of the pixels of the second binary image, for example pixels representable as black pixels;

overlay the first and second binary images to produce a combined binary image, wherein the pixels with the first state in one or both of the first and second binary images are pixels with a first state of first and second states of the pixels of the combined binary image, for example pixels representable as black in the combined binary image, and the pixels with the second state in both of the first and second binary images are pixels with a second state of first and second states of the pixels of the combined binary image, for example pixels representable as white pixels in the combined binary image; and determine the value relating to the amount of the substance based on the area of the combined binary image with pixels having the first state.

The image processing system may include an image analysis algorithm for one or more of producing the first binary image, producing the second binary image, overlaying the images and determining the value relating to the amount of the substance. In an example a single image processing algorithm is used to carry out all of these steps, and this may be executed on a single computing device as a part of the image processing system. However it will be appreciated that the various image processing steps could be split between multiple image processing algorithms on one or more computing devices and/or between multiple separate hardware or software modules of an example image processing system. The image processing algorithm may be implemented in the image processing system based on software on a programmable computing device such as a computer's Central Processing Unit (CPU), or it may be implemented fully or partly in hardware, for example using a Field Programmable Gate Array (FPGA) or Application Specific Integrated Circuit (ASIC).

The image processing system may be arranged to receive the original digital image from an imaging device, and optionally the imaging processing system may be implemented as a part of the imaging device, for example within a computer apparatus that controls the imaging device and processes the images from the imaging device. The imaging device may obtain images based on transmitted light, such as bright field or dark field imaging, and in particular including magnified images from microscopy imaging devices. Alternatively, the imaging device may obtain images based on based on reflected light and/or may make use of fluorescence of the substances to be imaged, again with the optional use of microscopy imaging devices. Combinations of reflected light, transmitted light and/or fluorescence may be used. The imaging device may include any type of camera, including area or line cameras, and CCD or CMOS type devices.

The imaging device may include the substance of interest, for example on a slide or in a sample holder. The substance may be a biological material in which case the image processing system may be for determining biomass in a sample shown in the image. The biological material may be a pathogen in a clinical sample, for example being tested to determine the drug susceptibility of the pathogen. The image processing system may be for antibiotic susceptibility testing (AST) and may be combined with an imaging device for imaging of samples for AST. The imaging device may include the samples.

The invention may further extend to a system for AST comprising the imaging device and/or the image processing system described above.

The invention may further extend to a system for AST and pathogen identification comprising the imaging device and/or the image processing system described above.

It will be appreciated that some or all of the foregoing advantages may be obtained by a method, computer programme product and image processing system which comprise only some of the steps set out in the first, second and third aspects, respectively, of the invention.

Thus, viewed from a fourth aspect, the invention provides a method for analysis of a digital image in order to determine a value relating to the amount of a substance shown in the image, wherein in the digital image the presence of the substance can be identified based on the intensity of pixels of the digital image, the method comprising one or more of the following steps:

using a threshold to identify all pixels of the digital image above or below a certain intensity value in order to produce a first binary image in which regions of high concentration of the substance are pixels with a first state of first and second states of the pixels of the first binary image, for example pixels representable as black pixels;

using texture filtering to identify regions of high texture in the digital image and produce a second binary image in which all regions of high texture are pixels with a first state of first and second states of the pixels of the second binary image, for example pixels representable as black pixels;

overlaying the first and second binary images to produce a combined binary image, wherein the pixels with the first state in one or both of the first and second binary images are pixels with a first state of first and second states of the pixels of the combined binary image, for example pixels representable as black in the combined binary image, and the pixels with the second state in both of the first and second binary images are pixels with a second state of first and second states of the pixels of the combined binary image, for example pixels representable as white pixels in the combined binary image; and determining the value relating to the amount of the substance based on the area of the combined binary image with pixels having the first state.

Any of the additional steps set out above in relation to the first aspect of the invention may apply equally here to the fourth aspect.

Viewed from a fifth aspect, the present invention may also provide a computer programme product containing instructions that when executed on a data processing system will cause the data processing system to carry out the method of the fourth aspect of the present invention, and optionally any or all of the additional steps set out above in relation to the first aspect of the invention.

Thus, the instructions, when executed, may cause the data processing system to analyse a digital image in order to determine a value relating to the amount of a substance shown in the image, wherein in the digital image the presence of the substance can be identified based on the intensity of pixels of the digital image, the analysis comprising one or more of the following steps:

using a threshold to identify all pixels of the digital image above or below a certain intensity value in order to produce a first binary image in which regions of high concentration of the substance are pixels with a first state of first and second states of the pixels of the first binary image, for example pixels representable as black pixels;

using texture filtering to identify regions of high texture in the digital image and produce a second binary image in which all regions of high texture are pixels with a first state of first and second states of the pixels of the second binary image, for example pixels representable as black pixels;

overlaying the first and second binary images to produce a combined binary image, wherein the pixels with the first state in one or both of the first and second binary images are pixels with a first state of first and second states of the pixels of the combined binary image, for example pixels representable as black in the combined binary image, and the pixels with the second state in both of the first and second binary images are pixels with a second state of first and second states of the pixels of the combined binary image, for example pixels representable as white pixels in the combined binary image;

and determining the value relating to the amount of the substance based on the area of the combined binary image with pixels having the first state.

Viewed from a sixth aspect, the present invention provides an image processing system arranged to carry out the method of the fourth aspect and optionally any or all of the additional steps set out above in respect of the first aspect.

Thus, there may be an image processing system for analysing a digital image in order to determine a value relating to the amount of a substance shown in the image, wherein in the digital image the presence of the substance can be identified based on the intensity of pixels of the digital image, the image processing system being arranged to carry out one or more of the following steps:

use a threshold to identify all pixels of the digital image above or below a certain intensity value in order to produce a first binary image in which regions of high concentration of the substance are pixels with a first state of first and second states of the pixels of the first binary image, for example pixels representable as black pixels;

use texture filtering to identify regions of high texture in the digital image and produce a second binary image in which all regions of high texture are pixels with a first state of first and second states of the pixels of the second binary image, for example pixels representable as black pixels;

overlay the first and second binary images to produce a combined binary image, wherein the pixels with the first state in one or both of the first and second binary images are pixels with a first state of first and second states of the pixels of the combined binary image, for example pixels representable as black in the combined binary image, and the pixels with the second state in both of the first and second binary images are pixels with a second state of first and second states of the pixels of the combined binary image, for example pixels representable as white pixels in the combined binary image; and determine the value relating to the amount of the substance based on the area of the combined binary image with pixels having the first state.

The image processing system may be for antibiotic susceptibility testing (AST) and may be combined with an imaging device for imaging of samples for AST. The imaging device may include the samples.

The invention may further extend to a system for AST comprising the imaging device and/or the image processing system described above.

The invention may further extend to a system for AST and pathogen identification comprising the imaging device and/or the image processing system described above.

certain preferred embodiments of the invention will now be described by way of example only and with reference to the accompanying drawings in which.

Figure 1:
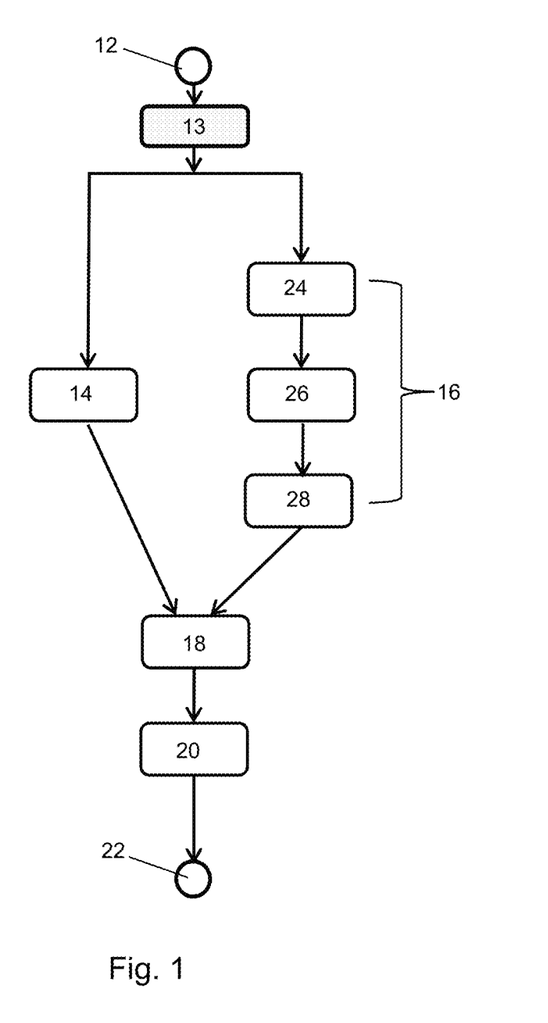
FIG. 1 is a flow chart for an image analysis method.

An image analysis process that can quantify the amount of a substance in an image, such as an image of biological material, is shown in FIG. 1. FIGS. 2 to 5 illustrate different steps in the process using images of S. aureus and E. coli as examples of the types of images that might be used. It will be appreciated that the image analysis process is not limited to only these examples. FIGS. 6 to 8 show various other examples of situations in relation to growth of pathogens where images with greatly differing characteristics can arise. As will be appreciated from the discussion below, the proposed image analysis process is effective in all of these situations, and will also have benefits in other situations where it is required to find the amount of a substance in an image and to be able to handle images with varying characteristics.

As shown in FIG. 1, a starting digital image 12 that shows a substance of interest such as biological material is passed to a noise-reduction step 13, and then a thresholding step 14 and a texture filtering process 16. In the noise-reduction step 13, artefacts in the image which are not indicative of the presence of the substance of interest are removed by subtracting from the original digital image 12 a reference image taken at an earlier time-point (for example, before the substance in the biological material has undergone substantial growth). Alternatively, instead of subtracting the reference image from the original digital image 12, the original digital image 12 may be divided by the reference image. The output from the thresholding step 14 is a first binary image with, in this example, black pixels showing an area of interest. The output from the texture filtering process 16 is a second binary image with, in this example, black pixels showing an area of interest. It will be appreciated from the discussion above that the use of black pixels is for illustration only, and the same method could be done with black and white pixels switched around or with a different visualisation of the binary images. The two binary images are then combined at step 18 and at step 20 the image analysis process determines the amount of black pixels, which gives a value relating to the amount of the substance of interest shown in the original digital image. This value is output at step 22, and could be used for further computer analysis, for example by a comparison of the value for different digital images, or comparison of the value to a threshold value.

Figure 2A:
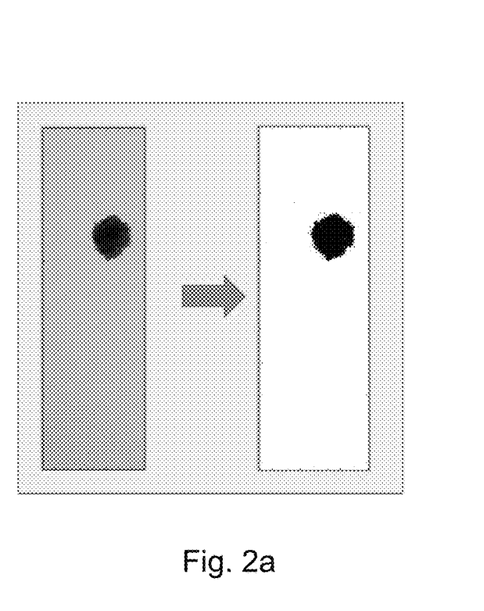
FIGS. 2a and 2b show the effect of a thresholding step on an original digital image showing a) S. aureus and b) E. coli.

Considering the various steps in more detail, and with reference to the other Figures, at step 14 the image processing system applies a threshold to the digital image to which the noise-reduction step 13 has been applied, which in this example sets a maximum intensity for the pixels of the original image and produces a binary image of the darkest regions, screening out regions with lighter pixels. This is shown in FIG. 2a for *S. aureus* where it is clear that the majority of clusters are captured, and shown in FIG. 2b for *E. coli* where it is clear that the threshold can remove too much from heavily textured images.

In parallel with the thresholding, the texture filtering 16 is carried out on the same digital image to which the noise-reduction step 13 has been applied. This enhances areas with high texture and suppresses regions with low texture. The texture filtering algorithm basically consists of three parts: Smoothing, variance filtering and thresholding.

First, smoothing is applied at step 24 to even out the irregularities in the background and to facilitate the downstream texture analysis. In one example, the smoothing is performed by using a 5×5 Gaussian filter with a σ of 2 (see Equation 1 and FIG. 1). The value for the pixel in each position (x, y) is calculated by multiplying the pixel values in the surrounding by the weights defined in the kernel (See Table 1) and summing up the values.

The equation for calculating a two dimensional Gaussian function $$G(x, y) = \frac{1}{\sqrt{2\pi\sigma^2}} e^{-\frac{x^2+y^2}{2\sigma^2}} \quad \text{Equation 1}$$

TABLE 1

A two dimensional 5 × 5 kernel describing the discrete weights for the pixel of interest (in grey) and the surrounding pixels.

| 0.0235 | 0.0340 | 0.0384 | 0.0340 | 0.0235 |
| --- | --- | --- | --- | --- |
| 0.0340 | 0.0490 | 0.0554 | 0.0490 | 0.0340 |
| 0.0384 | 0.0554 | 0.0627 | 0.0554 | 0.0384 |
| 0.0340 | 0.0490 | 0.0554 | 0.0490 | 0.0340 |
| 0.0235 | 0.0340 | 0.0384 | 0.0340 | 0.0235 |

It will be appreciated by those skilled in the art that alternative smoothing methods could be used.

After smoothing a texture filter is applied at step 26 in order separate low texture areas from high texture areas.

In a first example, a variance filter is applied at step 26. In this example the variance is calculated within a defined neighbourhood of 9×9 (d=9) pixels (see Equation 2). Low variance (i.e. low texture) gives low values and high variance (i.e. high texture) gives high values.

$$T_v(x, y) = \frac{1}{dxd} \sum_{s=-d}^{d} \sum_{t=-d}^{d} |g(x+s, y+t) - \bar{g}|^2$$

where $$\bar{g} = \frac{1}{dxd} \sum_{s=-d}^{d} \sum_{t=-d}^{d} g(x+s, y+t)$$

g(x, y) is the pixel value at position x, y

Equation 2 The variance filter at position x,y is calculated as the variance of the surrounding pixels Again, it will be appreciated that the variance filtering could be implemented using alternative techniques if required.

Moreover, instead of a variance filter, another type of texture filter could be used (for example, a gradient filter). The gradient filter measures the spatial variation of intensity across the image. A high gradient value is determined at any point in the image where the intensity varies abruptly (for example, from black to white). A low gradient is determined at any point where the intensity varies smoothly (for example, from a dark grey to a slightly lighter grey). The gradient may be positive or negative, depending on whether the intensity increases or decreases. However, in general, only the absolute gradient is used, since all that is of interest is whether the intensity variation is abrupt or smooth. A new image is created by the gradient filter, and this may be a grayscale image with the intensity of the pixels being set based on the gradient of the pixels in the smoothed image.

The gradient of an image g is defined as:

$$\nabla g = \begin{bmatrix} \frac{dg}{dx} \\ \frac{dg}{dy} \end{bmatrix} \quad \text{Equation 3}$$

where dg/dx is the derivative with respect to x (gradient in the x direction) and dg/dy is the derivative with respect to y (gradient in the y direction).

In some examples, only the absolute value of the gradient (i.e. its magnitude, without regard to its sign) is considered.

Figure 2B:
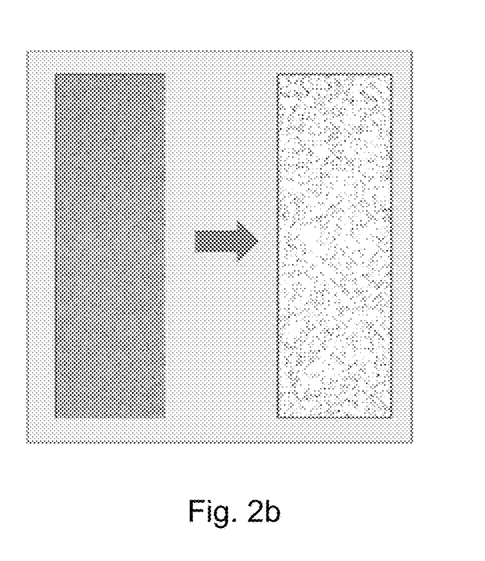
Figure 3A:
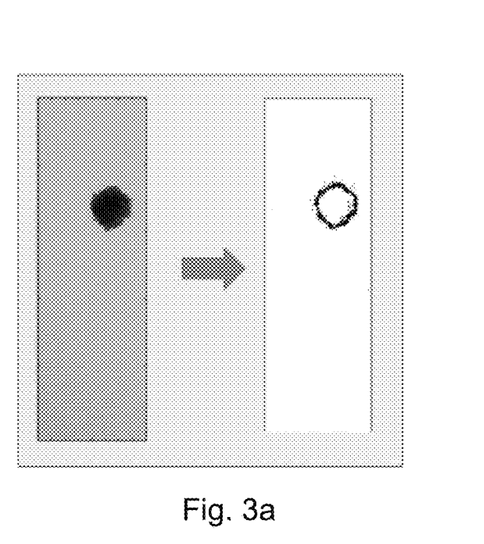
FIGS. 3a and 3b show the effect of texture filtering on an area of the original digital image showing a) S. aureus and b) E. coli.
Figure 3B:
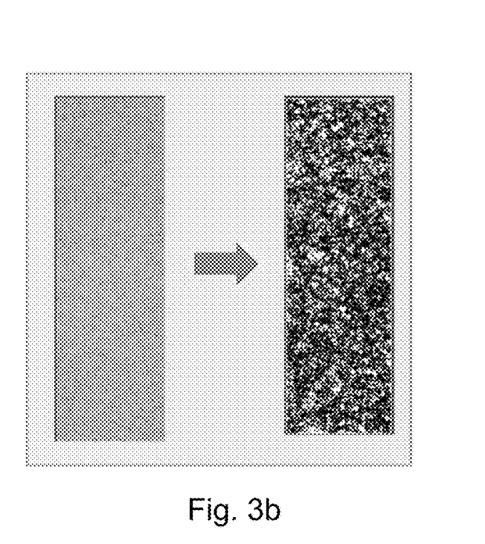
Figure 4:
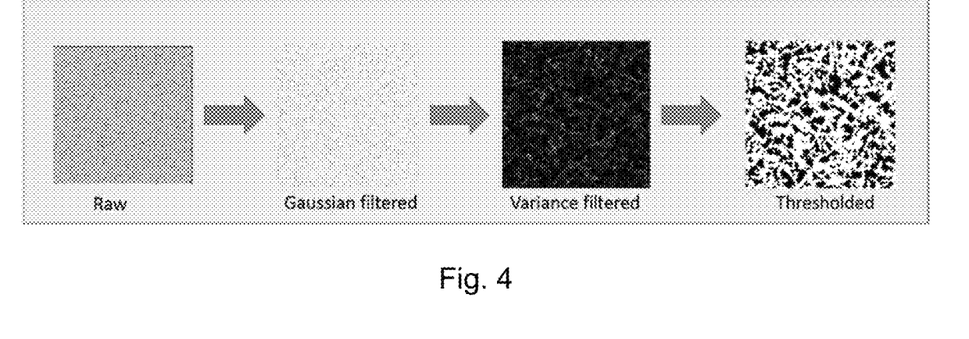
FIG. 4 shows the different processes carried out during the texture filtering of FIGS. 3a and 3b.

After the texture filter is applied at step 26, the resulting image is thresholded at step 28 to get a binary image where background is black and objects are white. FIGS. 3a and 3b show the effect of the texture filter (in this case, a variance filter) on the same original images as shown in FIGS. 2a and 2b. FIG. 4 shows the sequence of the steps of the texture filtering 16 as applied to an image similar to that of FIG. 2b. In the second binary image that is produced by texture filtering (in this case, variance filtering) the areas with high texture are considered to be objects and the rest is considered as background. The image is converted to a black/white image binary image.

Figure 5A:
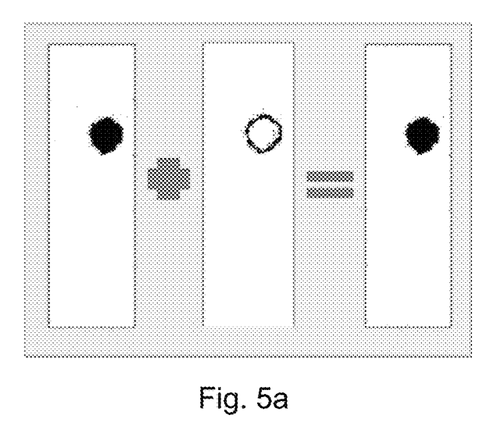
FIGS. 5a and 5b illustrate the process of overlaying the first and second binary images obtained a) in FIGS. 3a and 4a and b) in FIGS. 3b and 4b.
Figure 5B:
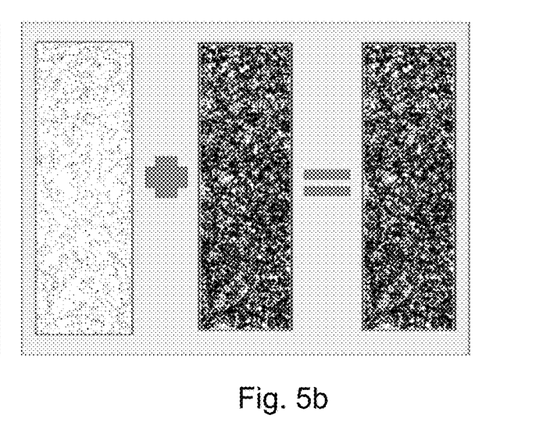

In order to achieve an algorithm that works for all kinds of morphology including highly textured images, the binary images from thresholding 14 and texture filtering 16 are combined to one image at step 18, as shown in FIGS. 5a and 5b. As can be seen, any pixels that are black in either image are black in the combined image. The estimated pathogen growth is then calculated at step 20 as the ratio between the objects and the total image area from the combined images, i.e. the percentage of covered area.

FIGS. 6 to 8 show various scenarios with non-limiting examples of where the proposed image analysis can be used. FIGS. 6a to 6g are microphotographs of different pathogens showing the range in morphologies for a) *P. aeruginosa*, b) *E. faecalis*, c) *P. mirabilis*, d) *S. pneumoniae*, e) *H. influenzae*, f) *E. coli* and g) *S. aureus*.

FIGS. 7a to 7j show the effect of antibiotics on the morphology of various pathogens. The microphotographs in a) to d) show *E. coli* grown for three hours either a) in absence of any antibiotics, b) and c) in presence of the antibiotic ceftazidime in different concentrations, and d) or in presence of the antibiotic meropenem. It is clear that the morphological change is not only dependent on the type of antibiotics but is also dose dependent. In b) and c) a thread-like change in morphology is seen whereas in d) a "swelling" of the pathogen is seen. The strain of *E. coli* shown in these Figures is meropenem sensitive. The microphotographs in e) to g) show *P.aureginosa* grown for three hours either e) in absence of any antibiotics, f) in presence of the antibiotic ceftazidime or g) in presence of the antibiotic meropenem. While the same antibiotics as for *E. coli* in the preceding Figures the morphology is different, showing "cluster threads" instead of individual threads. For meropenem the same morphological change occurs. The *P.aureginosa* strain shown is meropenem sensitive. The microphotographs of h) to j) show *P. mirabilis* grown for three hours either h) in absence of any antibiotics, i) in presence of the antibiotic ceftazidime or j) in presence of the antibiotic meropenem. Again, the morphology is different, showing a combination of "swelling" and threads. For meropenem the same morphological change occurs. The *P. mirabilis* strain shown is meropenem sensitive.

FIGS. 8a to 8e show different morphologies with different strains of the same pathogen, in this case *S. aureus*. This pathogen is known to aggregate in blood and any method to provide AST on *S. aureus* samples directly from blood would require to be able to handle aggregation and still report growth correctly. The Figures show growth of different strains of *S. aureus* isolated from blood culture flasks. The differences clearly show the need to have a generic image analysis capable of handling different morphologies and behaviour for pathogens. Even if one had a specific algorithm based on pathogen type, as has been suggested by others, then that would not help in this case.

The invention claimed is:

1. A method for analysis of a digital image in order to determine a value relating to the amount of a substance shown in the image, wherein in the digital image the presence of the substance can be identified based on the intensity of pixels of the digital image, the method comprising:
   using a threshold to identify all pixels of the digital image above or below a certain intensity value in order to produce a first binary image in which regions of high concentration of the substance are pixels with a first state of first and second states of the pixels of the first binary image;
   using texture filtering to identify regions of high texture in the digital image and produce a second binary image in which all regions of high texture are pixels with a first state of first and second states of the pixels of the second binary image;
   overlaying the first and second binary images to produce a combined binary image, wherein the pixels with the first state in one or both of the first and second binary images are pixels with a first state of first and second states of the pixels of the combined binary image and the pixels with the second state in both of the first and second binary images are pixels with a second state of first and second states of the pixels of the combined binary image; and
   determining the value relating to the amount of the substance based on the area of the combined binary image with pixels having the first state.

2. A method as claimed in claim 1, wherein the original digital images are images with a greater range of pixel intensity than the binary images, as including grayscale images or colour images.

3. A method as claimed in claim 1, wherein the digital images are images based on transmitted light, including bright field or dark field imaging, or wherein the digital images are images based on reflected light and/or make use of fluorescence of the substances to be imaged.

4. A method as claimed in claim 1, wherein the digital images are obtained from microscopy imaging devices.

5. A method as claimed in claim 1, wherein the substance is a biological material of a type that can take many different forms in the image, wherein the substance comprises one or more pathogen(s) that can grow or multiply in different morphologies.

6. A method as claimed in claim 1, wherein the biological material is a pathogen in a clinical sample being tested to determine the drug susceptibility of the pathogen.

7. A method as claimed in claim 1, being used for antibiotic susceptibility testing (AST), and wherein the digital image is one image of multiple digital images of pathogens growing in different conditions, including with different antibiotics and/or different antibiotic concentrations, and the substance is hence the amount of pathogens in the image; and wherein the method is repeated with other images of the multiple digital images.

8. A method as claimed in claim 7, including determining the minimal inhibitory concentration (MIC) of an antibiotic for inhibition of pathogen growth.

9. A method as claimed in claim 1, including repeated analysis of a sample including the substance of interest by using two or more digital images of the sample taken at different times in order to determine a change in the amount of the substance.

10. A method as claimed in claim 1, comprising determining the area of the first binary image with pixels having the first state of the first binary image and/or determining the area of the second binary image with pixels having the first state of the second binary image.

11. A method as claimed in claim 1, wherein the step of using a threshold to identify all pixels of the digital image above or below a certain intensity value comprises comparing an intensity value of each pixel to a threshold value, and assigning a state to each pixel such that all pixels that are one of either above or below the threshold value have the first state of the first binary image and all other pixels have the second state.

12. A method as claimed in claim 1, wherein the step of using texture filtering to identify regions of high texture in the digital image includes taking account of the difference in intensity of adjacent and/or nearby pixels and assigning the first state of the second binary image to those pixels in regions of higher variations in intensity, whilst assigning the second state to the other pixels, which will be in regions of lower variations in intensity, and wherein the texture filtering step includes determining the increase and decrease of intensity of pixels in the neighbourhood of the pixel of interest, and assigning the first state of the second binary image to pixels where there is an increase and decrease of intensity above or below a given value in the neighbourhood of the pixel of interest.

13. A method as claimed in claim 12 wherein the texture filtering step includes first smoothing the original image, then applying a texture filter and then applying a thresholding step.

14. A method as claimed in claim 13, wherein the texture filter is a variance filter which includes determining variance of the intensity of pixels in the neighbourhood of the pixel of interest in the smoothed image, and wherein a new variance filtered image is created by the variance filter, and this new image has the intensity of its pixels being set based on the variance of the neighbouring pixels in the smoothed image.

15. A method as claimed in claim 13, wherein the texture filter is a gradient filter which includes determining the gradient, preferably the absolute gradient, of the intensity of pixels in the smoothed image, and wherein a new gradient filtered image is created by the gradient filter, and this new image has the intensity of its pixels being set based on the gradient, preferably the absolute gradient, of the pixels in the smoothed image.

16. A method as claimed in claim 1, including a noise-reduction step carried out before the step of using a threshold to identify all pixels of the digital image above or below a certain intensity value and before the step of using texture filtering to identify regions of high texture in the digital image, the noise-reduction step comprising taking a first reference image at an initial time-point and subtracting that reference image from the digital image, or dividing the digital image by the reference image.

17. A computer programme product stored on a non-transitory computer readable medium containing instructions that when executed on a data processing system will cause the data processing system to carry out the method of claim 1, wherein the instructions, when executed, will cause the data processing system to analyse a digital image in order to determine a value relating to the amount of a substance shown in the image, wherein in the digital image the presence of the substance can be identified based on the intensity of pixels of the digital image, the analysis comprising:

using a threshold to identify all pixels of the digital image above or below a certain intensity value in order to produce a first binary image in which regions of high concentration of the substance are pixels with a first state of first and second states of the pixels of the first binary image;

using texture filtering to identify regions of high texture in the digital image and produce a second binary image in which all regions of high texture are pixels with a first state of first and second states of the pixels of the second binary image;

overlaying the first and second binary images to produce a combined binary image, wherein the pixels with the first state in one or both of the first and second binary images are pixels with a first state of first and second states of the pixels of the combined binary image, and the pixels with the second state in both of the first and second binary images are pixels with a second state of first and second states of the pixels of the combined binary image; and determining the value relating to the amount of the substance based on the area of the combined binary image with pixels having the first state.

18. An image processing system arranged to carry out the method of claim 1, wherein the image processing system is for analysing a digital image in order to determine a value relating to the amount of a substance shown in the image, wherein in the digital image the presence of the substance can be identified based on the intensity of pixels of the digital image, the image processing system being arranged to:

use a threshold to identify all pixels of the digital image above or below a certain intensity value in order to produce a first binary image in which regions of high concentration of the substance are pixels with a first state of first and second states of the pixels of the first binary image;

use texture filtering to identify regions of high texture in the digital image and produce a second binary image in which all regions of high texture are pixels with a first state of first and second states of the pixels of the second binary image;

overlay the first and second binary images to produce a combined binary image, wherein the pixels with the first state in one or both of the first and second binary images are pixels with a first state of first and second states of the pixels of the combined binary image, and the pixels with the second state in both of the first and second binary images are pixels with a second state of first and second states of the pixels of the combined binary image; and determine the value relating to the amount of the substance based on the area of the combined binary image with pixels having the first state.

19. An imaging device comprising an image processing system as claimed in claim 18, the imaging device including the substance of interest being on a slide or in a sample holder.

20. An imaging device as claimed in claim 19, wherein the substance is a biological material and the image processing system is for determining biomass in a sample of the substance shown in the image, wherein the biological material may be a pathogen in a clinical sample being tested to determine the drug susceptibility of the pathogen.

\* \* \* \* \*